C. PUTZEL.
ASH AND REFUSE VEHICLE.
APPLICATION FILED OCT. 26, 1910.
1,072,651.
Patented Sept. 9, 1913.
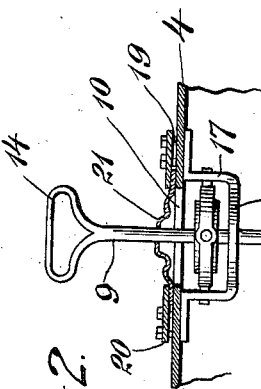
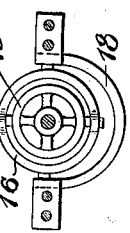
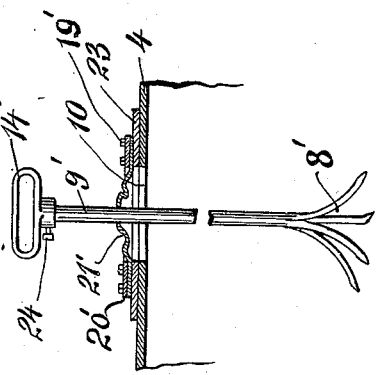
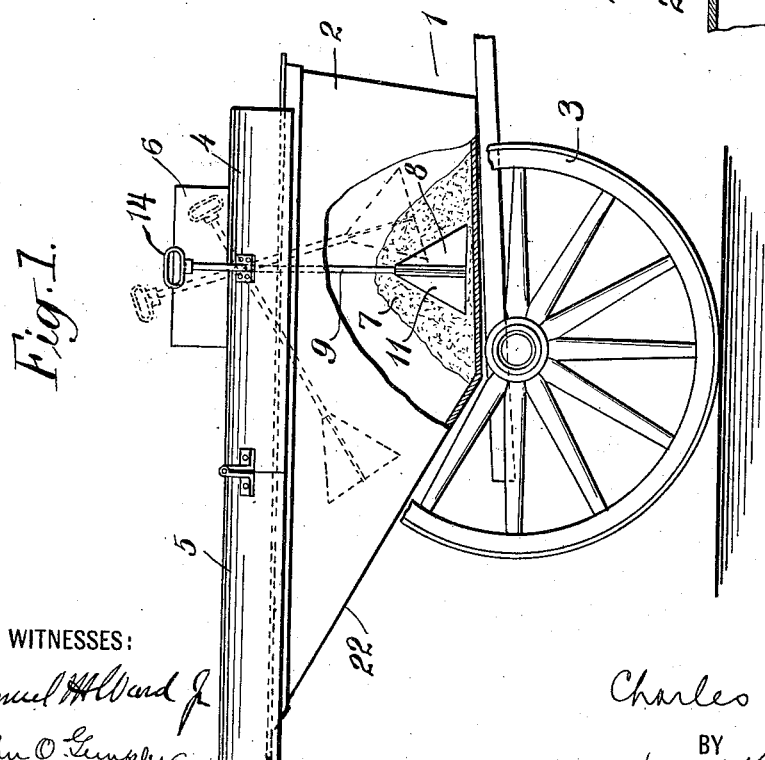
WITNESSES:
INVENTOR
Charles Putzel
BY
Wm H. Kenyon
ATTORNEYS
COLUMBIA PLANOGRAPH CO., WASHINGTON, D. C.

UNITED STATES PATENT OFFICE.

CHARLES PUTZEL, OF NEW YORK, N. Y.

ASH AND REFUSE VEHICLE.

1,072,651.  Specification of Letters Patent.  Patented Sept. 9, 1913.

Application filed October 26, 1910. Serial No. 589,124.

*To all whom it may concern:*

Be it known that I, CHARLES PUTZEL, a citizen of the United States, and a resident of the city of New York, borough of Manhattan, in the State of New York, have invented certain new and useful Improvements in Ash and Refuse Vehicles, of which the following is a specification.

My invention relates to ash and refuse vehicles, and more particularly to vehicles especially designed for collecting and conveying ashes without permitting the escape of dust into the air.

This invention is an improvement on the vehicle shown and described in an application of myself and George B. Marx Serial No. 578,754, filed September 12th, 1910, in the use of which vehicle ashes are collected in suitable cans and emptied into an inclosed body through a suitable hopper preferably placed on the top of the body.

The object of my invention is to provide a simple and efficient means for readily and uniformly distributing within the vehicle, the ashes which have been emptied through the hopper and which fall in a heap directly beneath the same. If no means is provided for distributing the ashes within the body, they are dumped in a pile directly beneath the hopper, and after this pile reaches the top of the vehicle, it will be impossible to further load the vehicle until the pile of ashes is leveled down and distributed within the body. It has been proposed to accomplish this by means of one or more rakes pivoted horizontally within the body of a wagon and operated by a suitable handle to oscillate longitudinally of the wagon; but such a construction is not only expensive to install, but is open to serious objections in operation and maintenance. If the rake is made of such size as to properly distribute the ashes within the wagon, it will soon be covered by the ashes to such an extent that its operation will be made very difficult, and after the wagon is fairly loaded, it will be practically impossible to move the rake without exerting more force than can be expected in the use of such an apparatus. And aside from this, the connections have to be proportionally strong and durable. Another disadvantage of such apparatus is that it interferes, more or less, with the dumping of a cart.

It is the object of my invention to provide a distributer which may be cheaply constructed and which will readily distribute the ashes throughout the cart and will not materially add to the cost of the cart or interfere with the dumping of the cart, and which may be operated with little effort.

Another object of my invention is to provide a distributer having universal movement, and which may be raised and lowered within the body so as to evenly distribute the ashes therein and without requiring the exertion necessary when such a distributer is deeply covered by the ashes.

My invention will best be understood from the following description taken in connection with the accompanying drawings in which—

Figure 1 shows, by way of example, a side elevation of a dump cart provided with the preferred form of my invention, certain parts of the cart being broken away to show the position of the distributer; Fig. 2 is a transverse section of a portion of the cover of the cart taken at the point where the distributer is mounted; Fig. 3 is a plan view of the apparatus shown in Fig. 2; and Fig. 4 is a modification.

Referring to the drawings, 1 is a dump cart having an inclosed body 2 mounted on wheels 3, and provided with a top 4 having a hinged rear portion 5. The top of the cart is provided with an opening in the form of a hopper 6 through which the ashes or refuse is emptied from suitably constructed garbage cans, in the manner described in the above mentioned application. As the ashes are emptied from the hopper, they pile up on the horizontal floor of the cart directly beneath the hopper, as shown at 7; and in order that the capacity of the cart will not be limited by the piling of the ashes directly beneath the hopper, I provide a suitable ash distributer 8 having a suitable handle which, in the present form of my invention, consists of a rod 9 extending through an opening 10 in the top of the cart.

The distributer preferably consists of a plurality of projections, prongs or fins 11 extending out radially from the rod. These projections, according to their shape and form, may form an integral part of the rod or may be permanently or detachably secured thereto.

In the best embodiment of my invention now known to me, I prefer to use a plurality of triangular shaped fins formed preferably of sheet metal and suitably held together and detachably secured at the lower end of the rod in any suitable manner such as by a pin 12 extending through a sleeve 13 formed by the abutting portions of the different fins 11. The rod is provided at its top with any suitable handle such as a loop 14 formed in the rod itself.

In the best embodiment of my invention, in order to permit free movement of the distributer in any direction, I mount the handle slidably within a ring or other suitably formed inner member 15 of a universal connection, said inner ring being pivoted in the usual manner upon a suitable outer member 16 of the universal connection which is, in turn, pivoted in a bracket 17 preferably secured to the cover of the cart within the body. This bracket is preferably formed out of a single strip or bar of wrought metal bent in the general form of a U and having the lower end of the loop displaced laterally as at 18 in order to provide for the movements of the rod and universal connection. This bracket is preferably bolted to the cover of the cart by means of suitable bolts 19, which may also extend through a clamping ring 20 between which and the cover 4 a suitable piece of flexible material 21, such as leather, may be gripped in order to close the opening and prevent the escape of dust in the air. The opening 10 is made large enough to permit a rather free movement of the handle 9 in any direction, but the opening in the leather 21 through which the handle passes, need only be the size of the diameter of the handle, since the yieldable property of the member 21 will permit the limited movement necessary. It will thus be seen that when the distributer is arranged with the free movements as above described, the ashes may be evenly distributed throughout the cart, even being thrown far back on the inclined tail portion 22, and that as the wagon is filled up, the handle member 9 may be raised or pulled out so as to raise the distributer as the cart is loaded, thus preventing the exertion which would be necessary to operate it if it were fixed in position so as to be covered by the ashes.

In Fig. 4, I have shown a less expensive manner of mounting the handle in the opening 10. In this form of the invention, the cover 4 at the opening 10 is reinforced by a suitable plate 23 preferably riveted to the cover 4, and upon the reinforced plate a suitable flexible covering 21' is provided to prevent the escape of dust through the opening. While this construction is simpler and cheaper to construct, it requires greater exertion to move the distributer back and forth in different directions within the body. In this modification, I have also shown the distributer in the form of radial prongs 8' formed at the end of the rod 9, and I have shown the handle 14' in the form of a detachable casting secured to the rod by a set screw 24.

While it is possible to reap certain benefits from my invention by mounting the handle member in the side of the cart, it is far preferable to mount the same in the top of the cart in the manner shown, since the distributer will present greater resistance in distributing the ashes laterally, and at the same time the handle may be moved in and out toward and away from the body to adjust the position of the distributer according to the amount of ashes in the cart; and where the universal connection is used, the same is kept above the ashes and thus free from being clogged.

While I have shown and described my invention in the best form now known to me, it is obvious that many changes may be made in the arrangement and construction of the parts without departing from the spirit of my invention, and I do not wish to be understood as limiting myself to any particular arrangement or construction except as hereinafter specifically set forth in the appended claims.

What I claim as new and desire to secure by Letters Patent, is:

1. In an ash or refuse cart, the combination of a closed body receiving the ashes, the top of said body having a normally closed hopper through which the ashes are emptied into the body, a second opening in the top of said body, an ash distributer within the body, and a handle member connected to and operating the same and extending through said last opening and movable longitudinally and laterally of the body, whereby the ashes may be uniformly distributed within said body.

2. In an ash or refuse cart, the combination of a closed body receiving the ashes, said body having an opening in its top through which the ashes are emptied into the body, a second opening in said top, a rod extending through said last opening and a pronged ash distributer carried at the end of said rod, said rod being free to move in the opening toward and away from the body, a universal movement at the opening, through which movement the rod extends, whereby the ashes may be uniformly distributed within the body.

3. In an ash or refuse cart, the combination of a closed body receiving the ashes, said body having an opening therein through which the ashes are emptied into the body, a second opening in said body, a rod projecting through said last opening and carrying an ash distributer at its inner end, said distributer having lateral and longitudinal motion, and a flexible cover closing said opening and through which said rod passes, whereby the ashes may be uniformly distributed within said body.

4. In an ash or refuse cart, the combination of a closed body receiving the ashes, said body having an opening in its top wall through which the ashes are emptied into the body, a second opening in said top wall of the body, a universal connection mounted at said last opening, a rod extending through the opening and engaging one member of said connection, and an ash distributer carried at the lower end of said rod whereby the ashes may be uniformly distributed within the body.

5. In an ash or refuse cart, the combination of a closed body receiving the ashes, said body having an opening in its top wall, a supporting bracket mounted adjacent the opening, a universal connection mounted in said bracket and comprising inner and outer pivoted members, a handle member slidably mounted in the inner member of said connection, and an ash distributer carried at the lower end of said handle within said body, whereby the ashes may be uniformly distributed within said body.

6. In an ash or refuse cart, the combination of a closed body receiving the ashes, said body having an opening therein through which the ashes are emptied into the body, a second opening in said body, a supporting bracket mounted within the body in alinement with said last opening, a universal connection mounted on said bracket and comprising inner and outer pivoted members, a handle member slidably mounted in the inner member, a flexible covering for said opening through which the handle member passes, and an ash distributer comprising a plurality of fins detachably carried at the inner end of said handle member, whereby the ashes may be uniformly distributed within said body.

7. In an ash or refuse cart, the combination of a closed body receiving the ashes, said body having an opening therein through which ashes are emptied into the body, a second opening in the top wall of said body, a handle member slidably projecting through said last opening and carrying an ash distributer at its inner end, and a flexible cover for said opening through which the handle member projects, said handle member having universal motion whereby the ashes may be uniformly distributed within said body.

In testimony whereof, I have signed my name to this specification, in the presence of two subscribing witnesses.

CHARLES PUTZEL.

Witnesses:
SAMUEL M. WARD, Jr.,
EDWIN SEGER.